Oct. 24, 1961  G. S. SANGDAHL, JR., ET AL  3,005,258
METHOD OF BRAZING WITH METAL POWDERS BELOW THE
MELTING POINT OF EITHER METAL POWDER
Filed July 10, 1958

Inventors:
George Stanley Sangdahl, Jr.
and Jules G. Dupre,
By Merriam, Lorch, Smith,
Attys.

United States Patent Office 3,005,258
Patented Oct. 24, 1961

3,005,258
METHOD OF BRAZING WITH METAL POWDERS BELOW THE MELTING POINT OF EITHER METAL POWDER
George Stanley Sangdahl, Jr., Birmingham, and Jules G. Du Pre, Homewood, Ala., assignors to Chicago Bridge and Iron Company, Chicago, Ill., a corporation of Illinois
Filed July 10, 1958, Ser. No. 747,657
6 Claims. (Cl. 29—494)

This invention relates to brazed joints and the production of clad plates by brazing. More particularly, this invention is concerned with novel methods of producing brazed joints and especially the brazed bonds of clad plates produced by the vacuum brazing method described in R. L. Brown Patent 2,713,196, issued July 19, 1955.

As shown in Patent 2,713,196, clad plates may be produced by preparing a cladding sandwich having a base plate and a cladding plate in face-to-face arrangement to each other with a layer of brazing material between the base plate and the cladding plate, evacuating the area between the base plate and the cladding plate and heating the sandwich while so evacuated to a temperature sufficient to melt the brazing material but below the melting point of the base plate and cladding plate, and then cooling the sandwich to ambient temperature. Generally, the vacuum is maintained until at least the brazing material has solidified, and advisably until the sandwich is at a much lower temperature and even at ambient temperature.

For all brazing processes, including the Brown vacuum brazing process for producing clad plates, the brazing material must be selected to melt at a temperature below the melting points of the metals or plates involved and also at temperatures which permit brazing while avoiding undesirable changes in crystal structure or have other adverse effects. Furnace limitations also preclude the use of some metals as brazing materials.

The brazing material used in the Brown process may be in the form of foil, screening or powder, or it may be electroplated or chemically deposited. Either a pure metal or an alloy of two or more metals may be used. The brazing material selection is dependent on several factors, the most important of which is its melting point. Alloys which melt at desirable temperatures are often available only as powders but not in foil or screen form other than on custom order because there is insufficient demand for them, or because they cannot be produced in these forms due to a lack of technical knowledge or proper equipment.

To facilitate handling and assembly of the brazing sandwiches when a powdered brazing material is used in the Brown process, it is advisable to apply the powder to at least one of the bonding surfaces with a binder, preferably as a liquid suspension. One suitable vehicle may have the composition:

| | Percent by weight |
|---|---|
| Hydroxyethylcellulose | 1.5 |
| Water | 98.5 |

Such a vehicle will suspend about 100 gm. of brazing powder in about 35 gm. of vehicle. The suspension lends itself well to spraying on the surface of the plate to be brazed. After the mixture of brazing powders and liquid vehicle has been sprayed onto the plates, the plates are dried, the cladding sandwich is assembled and handled in the conventional manner to effect brazing.

Some of the powdered brazing alloys, while expensive, are particularly useful because they have melting points below temperatures at which the cladding plate might undergo adverse crystal structure changes. One such useful brazing alloy is manganese-nickel. This brazing alloy, and others, is particularly useful primarily because it has a melting point substantially below the melting points of the elemental metals of which it is composed. Mixtures of the elemental metals in powder form, which incidentally are readily available at reasonable prices, having the same proportions of metals as in these brazing alloys were not used because heating to the melting point of the elemental metal having the lowest melting point was considered essential to cause melting. Accordingly, where the melting point of the elemental metal was higher than any minimum temperature which adversely affected the cladding plate it was believed impracticable to employ powdered elemental metal mixtures even though alloys of the same composition were suitable for brazing because of their low melting points.

These concepts have been found to be in error. By the present invention it has been discovered that certain mixtures of powdered elemental metals melt at a temperature below the melting point of any of the metals contained in the mixture. The melting point of these mixtures is the same as for any alloy having the same proportion of metals as in the mixture. Heretofore this had not been thought possible.

By using mixtures of powdered elemental metals as the brazing material in a cladding sandwich, heating of the sandwich results in the simultaneous formation of the brazing alloy in situ and bonding of the plates at a temperature below the melting points of the individual metals in the mixture. Clad plates produced by this procedure are soundly clad with a completely alloyed filler metal joining the cladding and the base plate to form a strong joint.

Since the brazing powder mixture may be altered readily in composition it is now possible to braze with a wide variety of alloy compositions not heretofore available except by custom order at high prices.

The particle size of the powdered metals is not narrowly critical. However, melting takes place more rapidly with smaller particle sized metals than with larger particles. In general, powdered metals of about 50 mesh particle size, and advisably below 100 mesh or smaller, are employed.

An intimate and homogeneous mixture of the powdered metals is readily achieved by conventional techniques and apparatus.

Representative of the alloys which may be prepared in situ during the brazing process according to the described procedures are nickel-manganese, and copper-manganese, both of which alloys, within certain ranges of ingredients, melt at temperatures below the melting point of the individual metals forming the alloy.

The invention is also applicable to the formation of alloys in situ during brazing in which one of the powdered ingredients is an alloy powder, instead of an elemental metal. Thus, a brazing alloy may be formed in situ by heating a mixture of an alloy powder and an elemental powdered metal or different powdered alloy to a temperature below the melting point of any one of the powders in an unmixed, pure form but to an elevated temperature generally within the melting point of an alloy having the same composition of the powder mixture but below the melting points of the elemental metal present.

Throughout this application all references to proportions of metals in mixtures or in alloys are proportions by weight.

Particularly useful brazing powder mixtures comprise nickel powder and manganese powder in various percentages. Manganese has a melting point of 2300° F. and nickel a melting point of 2651° F. Alloys of these two metals, however, containing appreciable amounts (5% or more) of each metal melt at temperatures significantly below 2300° F. Such alloys are not readily available commercially and must be custom made. It has been found though that mixtures of these elemental metals in powdered form and used as brazing material as for vacuum brazing clad plates, will melt and form a solidly brazed joint at temperatures much below 2300° F. (the melting point of the manganese powder). However, between 25-90% by weight of manganese with the remainder nickel should be present in the powdered brazing mixture because with less or greater amounts of manganese present, the mixture would melt above about 2200° F. In the brazing of stainless steels to base plates the manganese content of the powdered brazing material should be 30-85%, and advisably 40-75%, with the remainder nickel. Mixtures with the 40-75% manganese content would melt below about 2000° F. and between 30-85% manganese melting would be below about 2100° F. Although a manganese-nickel alloy containing 60% manganese has the lowest melting point, a somewhat higher manganese content, such as 67%, is often used to avoid brittleness encountered with less manganese.

The vacuum brazing process for producing clad is especially adaptable for successful employment of such powdered metal mixtures as the brazing material because it prevents the oxidation of manganese which has poor oxidation resistance, especially at elevated temperatures. However, the invention is not limited to forming brazed joints under vacuum or by the Brown process since it has much more extensive applications.

Another particularly useful brazing powder mixture for bonding low melting clad products such as copper and copper alloys comprises manganese powder homogeneously (intimately) mixed with copper powder. Such a mixture containing no more than 68% manganese will melt below the melting point of pure copper (M.P. 1980° F.). The practical composition of the brazing mixture should contain about 10 to about 55% manganese powder with the balance copper powder. Such mixtures melt below about 1815° F. The optimum mixture would contain 35% manganese, with the balance copper, and would melt at about 1595° F.

Other metals whose mixtures would similarly be useful as brazing materials are silver-copper, gold-copper, beryllium-copper, bismuth-tin, iron-boron, and nickel-silicon. Powdered mixtures of these metals melt below the melting points of the elemental metals in the mixture.

Certain aspects of the invention will now be described in conjunction with the attached drawings in which.

Figure 1:
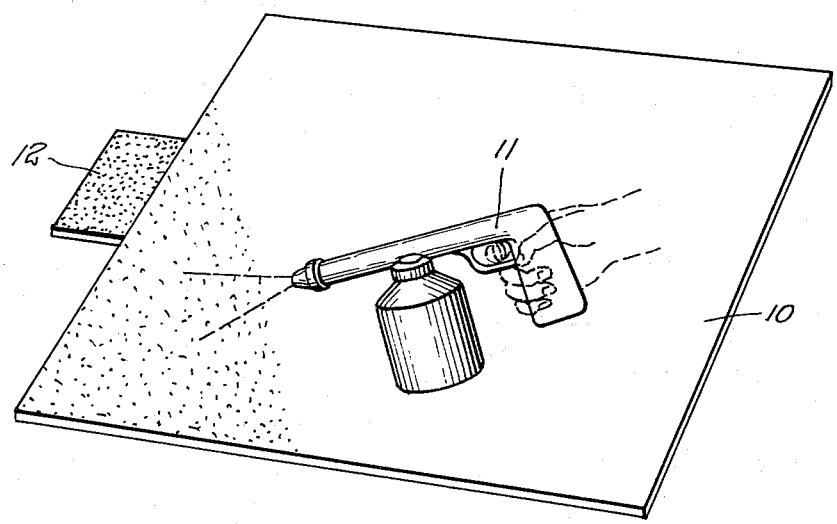
FIG. 1 is a perspective view of a plate being sprayed with a liquid composition containing a mixture of metal powders.

After a liquid brazing composition is prepared as described supra it may be applied to one or both of the surfaces to be brazed together as by brushing and spraying. For spraying, the plate 10 as shown in FIG. 1 is placed in a horizontal position and the liquid suspension of the brazing powder mixture sprayed on by means of spray 11. The horizontal position prevents running of the liquid. To determine the amount of brazing material applied to plate 10, a card or strip 12, previously weighed, is placed adjacent the plate and sprayed simultaneously. After drying, it is again weighed to determine the quantity of brazing powder mixture deposited. A spray pressure of 25 p.s.i. and a distance of 9 to 30 inches from the gun nozzle to the plate gives a good spray deposit. Generally, about 25 to 100 grams of brazing powder mixture (after drying) per square foot is proper for most brazing while 40-50 grams is a satisfactory normal application.

Figure 2:
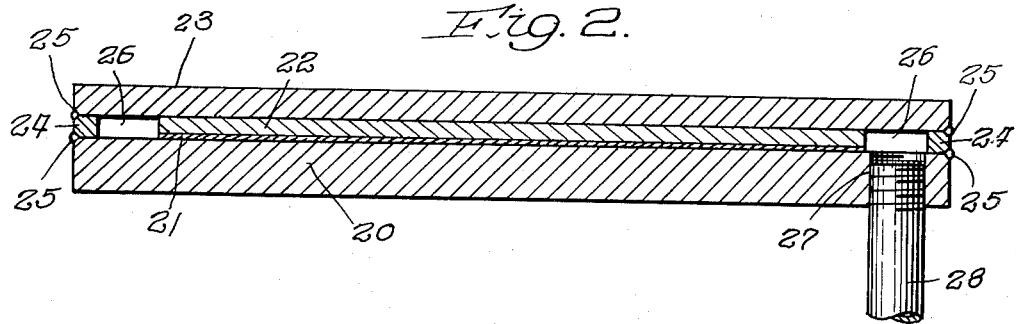
FIG. 2 is a sectional view of a single cladding sandwich.

FIG. 2 shows a single cladding sandwich, which is one of many variations that may be used for cladding, using a high vacuum. A cladding assembly is made up of a base plate 20 which is covered with a brazing mixture of powdered metals 21 applied such as by spraying suspended in a liquid vehicle. Over the brazing material 21 is placed cladding plate 22 on top of which is put cover plate 23, preferably of thin steel. Shims 24 are placed around the sandwich and welded 25 to the cover plate and base plate 20. Corridor 26 around the cladding plate aids in removal of gases and allows space for differential expansion of the clad layer 22 relative to the base plate 20. If the cladding sheet is thin, shims need not be used since the cover plate may be welded directly to the base plate. Opening 27 is provided in the base plate for drawing a vacuum by line 28 in the sandwich and area to be clad. Heat is when applied to the evacuated sandwich to raise the temperature to a temperature considerably below the melting point of either metal powder. However, a temperature is reached which is high enough to cause the brazing mixture to melt and wet the mating surfaces of the base plate and cladding plate. The sandwich is then cooled and trimmed to obtain the desired clad plate.

While FIG. 2 shows the use of a cover plate, this is not necessary in all cases because the cladding plate may be hermetically sealed to the base plate by a direct weld or a weld in combination with a shim or filler strip.

A substantial vacuum is advisably used in the process. A vacuum over 18" of mercury gauge is almost always employed and in most cases the vacuum is of the order of 28-29" of mercury gauge. Such a vacuum prevents oxide formation. In addition, with a high vacuum the pressure of the atmosphere presses the plates together with a pressure of about 2000 lbs. per sq. ft. to assure continuous intimate contact between the base plate and the cladding plate.

Figure 3:
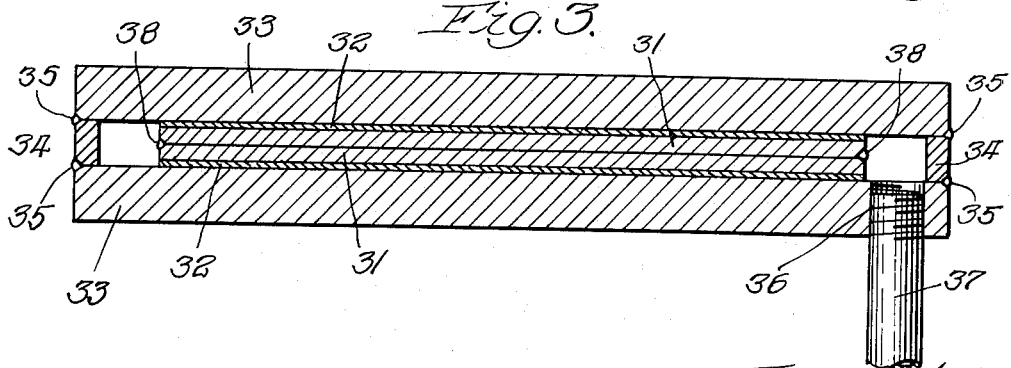
FIG. 3 is a sectional view of a double cladding sandwich.

FIG. 3 shows a double cladding sandwich having two cladding plates 31 placed back-to-back with brazing powder mixtures 32 against the outer surfaces of each cladding plate. In face-to-face arrangement with the brazing material are placed two base plates 33 of slightly larger size. Bars 34 are welded 35 to the base plates to seal the sandwich interior from the atmosphere. Weld 38 prevents the brazing material from migrating between the cladding plates. By means of outlet 36 and vacuum line 37 the sandwich is evacuated and brazing effected as described above and more completely in Brown Patent No. 2,713,196.

The brazing powder mixtures are advisably composed of elemental metals in powdered form. However, while it is, of course, possible to employ a powdered brazing alloy as part of the brazing powder mixture, no practical gain is generally achieved by doing this.

The following examples are presented to illustrate the invention.

*Example 1*

A double cladding sandwich, similar to FIG. 3, was formed of the following plates:

1 base plate 14" x ⅜" x 14" A285 Gr. C. Steel.
1 base plate 15" x ⅜" x 15" A285 Gr. C. Steel.
2 cladding sheets 12" x 12 ga. x 12" 316L Stainless.

A mixture of ⅔ Mn and ⅓ Ni, both in powder form, was applied in a liquid vehicle between the top base plate and top cladding plate by spraying.

Screen analysis showed the fineness of the nickel powder to be:

100% through 50 mesh
    1% max. on 80 mesh
    5% min. on 150 mesh
    60% max. through 325 mesh Screen analysis showed the fineness of the manganese powder to be:

100% through 50 mesh
    1% max. on 60 mesh
    35% max. through 325 mesh

About 2 ounces per square foot of the foregoing mixture was sprayed on the upper base plate.

Between the bottom base plate and cladding plate a powdered mixture comprising ⅓ Mn, ⅙ Ni and ½ a Mn-Ni alloy (M.P. 1850–1900° F.) composed of 68% Mn and 32% Ni was also mixed in a liquid vehicle and applied by spraying.

After the sandwich was evacuated to a 9 micron vacuum (0 micron being complete vacuum) it was inserted into a furnace preheated to 1700° F. The temperature was raised to 2050° F. in 80 minutes, held there for 30 minutes and decreased during the next 50 minutes to 1800° F. At no time during heating did the vacuum go lower than 17 microns. The sandwich was then removed from the furnace, air cooled and normalized.

The clad made with ⅔ Mn-⅓ Ni powder had a shear strength of 36,000 p.s.i. The other clad had a shear strength of 34,800 p.s.i. Both clad plates withstood bends of 180° in tension and in compression without failure.

Melting of the Mn-Ni powders had thus taken place in the upper cladding bond below the melting points of manganese and nickel to form a bond as good as, if not better than, one formed of similar powdered mixtures containing part of the metal previously alloyed.

*Example 2*

A sandwich was prepared identical with that of Example 1, evacuated, and heated to a bonding temperature of 1950° F. in a furnace preheated to 1700° F. Cooling and heating rates of 300° F./hour were used and the sandwich held at 1950° F. for one-half hour. The sandwich was removed from the furnace at 1850° F., air cooled and normalized. Microscopic examination revealed that the manganese and nickel powders had melted and formed an alloy with a melting point below 1950° F. The bonds, however, had shear strengths of 15,500 p.s.i. (upper plate) and 25,900 p.s.i. (lower plate) which indicated insufficient time at the bonding temperature after formation of the brazing alloy to obtain complete melting.

*Example 3*

A mixture of ⅔ manganese powder and ⅓ nickel powder was sifted into place between the bottom base plate and the bottom cladding plate in a sandwich like that of Example 1. The brazing material between the top base plate and the top cladding plate was sprayed over one-half of the bonding surface. Bonding was accomplished as in Example 2, after the sandwich was evacuated, at a temperature of 2050° F. The sandwich was cooled as in Example 2, removed from the furnace, cooled to room temperature and normalized.

The bond of the bottom plate had a shear strength of 33,500 p.s.i. and successfully passed the 180° bends in tension and compression.

The bond of the top plate was found to have extended to that portion of the clad plate where the powder had not been sprayed on indicating that the brazing alloy which formed by melting of the powder mixture had sufficient fluidity to flow considerable distances (5 inches in this test). The bond, however, where the brazing powder was not initially applied was of low value. The fluidity of the resulting alloy nevertheless is clearly more than necessary to fill up areas which initially may not have completely adequate amounts of brazing material.

Various changes and modifications of the invention can be made and, to the extent that such variations incorporate the spirit of this invention, they are intended to be included within the scope of the appended claims.

What is claimed is:

1. In a process of producing clad plates by vacuum brazing, the improvement which comprises preparing a cladding sandwich having a ferrous plate and a stainless steel cladding plate in face-to-face position with an intimate brazing mixture composed of 30 to 85% powdered manganese and the remainder powdered nickel uniformly applied in a thin layer between the base plate and the cladding plate, evacuating the area between the base plate and the cladding plate and heating the sandwich while so evacuated to a temperature above the melting point of a manganese-nickel alloy having the same composition as the powdered mixture but below the melting points of the metals in the brazing mixture and below the melting points of the base plate and cladding plate, and cooling the sandwich to an ambient temperature.

2. In a process of producing clad plates by vacuum brazing, the improvement which comprises preparing a cladding sandwich having a base plate and a cladding plate in face-to-face position with a homogeneous brazing mixture uniformly applied in a thin layer between the base plate and the cladding plate, the brazing mixture comprising about 25 to 90% powdered manganese and the remainder powdered nickel, evacuating the area between the base plate and the cladding plate and heating the sandwich while so evacuated to a temperature above the melting point of a manganese-nickel alloy having the same composition as the powdered mixture but below the melting point of the metals in the brazing mixture and below the melting point of the base plate and cladding plate, and cooling the sandwich to an ambient temperature.

3. In a process of producing clad plates by vacuum brazing, the improvement which comprises preparing a cladding sandwich having a base plate and a cladding plate in face-to-face position with a homogeneous brazing mixture uniformly applied in a thin layer between the base plate and the cladding plate, the brazing mixture comprising 10 to 68% powdered manganese and the remainder powdered copper, evacuating the area between the base plate and the cladding plate and heating the sandwich while so evacuated to a temperature above the melting point of a manganese-copper alloy having the same composition as the powdered mixture but below the melting point of the metals in the brazing mixture and below the melting point of the base plate and cladding plate, and cooling the sandwich to an ambient temperature.

4. In a process of producing clad plates by vacuum brazing, the improvement which comprises preparing a cladding sandwich having a base plate and a cladding plate in face-to-face position with a homogeneous brazing mixture uniformly applied in a thin layer between the base plate and the cladding plate, the brazing mixture comprising 30 to 85% by weight of powdered manganese and the remainder powdered nickel, evacuating the area between the base plate and the cladding plate and heating the sandwich while so evacuated to a temperature above the melting point of a manganese-nickel alloy having the same composition as the powdered mixture but below the melting point of the metals in the brazing mixture and below the melting point of the base plate and cladding plate, and cooling the sandwich to an ambient temperature.

5. In a process of producing clad plates by vacuum brazing, the improvement which comprises preparing a cladding sandwich having a base plate and a cladding plate in face-to-face position with a homogeneous brazing mixture uniformly applied in a thin layer between the base plate and the cladding plate, the brazing mixture comprising 10 to 55% by weight of powdered manganese and the remainder powdered copper, evacuating the area between the base plate and the cladding plate and heating the sandwich while so evacuated to a temperature above the melting point of a manganese-copper alloy having the same composition as the powdered mixture but below the melting point of the metals in the brazing mixture and below the melting point of the base plate and cladding plate, and cooling the sandwich to an ambient temperature.

6. In a process of producing clad plates by vacuum brazing, the improvement which comprises preparing a cladding sandwich having a base plate and a cladding plate in face-to-face position with a homogeneous brazing mixture uniformly applied in a thin layer between the base plate and the cladding plate, the brazing mixture comprising a member of the groups consisting of (1) powdered manganese and powdered nickel containing at least 5% of each metal and in a proportion which yields an alloy of the metals having a melting point below the melting point of manganese, and (2) powdered manganese and powdered copper in a proportion which yields an alloy of the metals having a melting point below the melting point of copper and containing 10 to 68% manganese, evacuating the area between the base plate and the cladding plate and heating the sandwich while so evacuated to a temperature above the melting point of an alloy having the same composition as the powdered mixture but below the melting point of the metals in the brazing mixture and below the melting point of the base plate and cladding plate, and cooling the sandwich to an ambient temperature.

References Cited in the file of this patent

UNITED STATES PATENTS

| | | |
|---|---|---|
| 2,133,291 | Gordon | Oct. 18, 1938 |
| 2,237,184 | Lemmers | Apr. 1, 1941 |
| 2,627,110 | Hickey | Feb. 3, 1953 |
| 2,652,623 | Marden | Sept. 22, 1953 |
| 2,713,196 | Brown | July 19, 1955 |
| 2,850,798 | Bowman et al. | Sept. 9, 1958 |

FOREIGN PATENTS

| | | |
|---|---|---|
| 487,263 | Great Britain | June 17, 1938 |
| 551,174 | Great Britain | Feb. 10, 1943 |